(12) United States Patent
Cai

(10) Patent No.: US 8,904,638 B2
(45) Date of Patent: Dec. 9, 2014

(54) HEAT EXCHANGER FOR A BATHING SHOWER

(75) Inventor: Ying Lin Cai, Guangdong (CN)

(73) Assignees: Ying Lin Cai, Guangdong (CN); Chao Fou Hsu, Kaohsiung (TW)

( * ) Notice: Subject to any disclaimer, the term of this patent is extended or adjusted under 35 U.S.C. 154(b) by 1261 days.

(21) Appl. No.: 12/659,003

(22) Filed: Feb. 23, 2010

(65) Prior Publication Data
US 2010/0212878 A1 Aug. 26, 2010

(30) Foreign Application Priority Data

Feb. 25, 2009 (CN) .......................... 2009 2 0051940
Mar. 4, 2009 (CN) .......................... 2009 2 0052225

(51) Int. Cl.
| | |
|---|---|
| *F28D 9/00* | (2006.01) |
| *F28D 1/03* | (2006.01) |
| *B21D 53/04* | (2006.01) |
| *B23P 15/26* | (2006.01) |
| *E03C 1/00* | (2006.01) |
| *F24D 17/00* | (2006.01) |
| *F28D 3/00* | (2006.01) |
| *F28F 3/04* | (2006.01) |
| *F28D 21/00* | (2006.01) |

(52) U.S. Cl.
CPC .............. *F28D 1/0308* (2013.01); *B21D 53/04* (2013.01); *B23P 15/26* (2013.01); *E03C 1/00* (2013.01); *F24D 17/0005* (2013.01); *F28D 3/00* (2013.01); *F28F 3/044* (2013.01); *F28D 21/0012* (2013.01); *E03C 2001/005* (2013.01); *F24D 2200/20* (2013.01); *Y02B 30/18* (2013.01)
USPC .............. 29/890.03; 29/890.034; 29/890.039; 29/890.14; 219/137 R; 219/136

(58) Field of Classification Search
USPC ......... 29/890.03, 890.034, 890.038, 890.039, 29/890.04, 890.045, 890.14, 897.31; 165/170; 219/137 R, 136; 72/365.2, 72/366.2, 379.2, 363
See application file for complete search history.

(56) References Cited

U.S. PATENT DOCUMENTS

| | | | | | |
|---|---|---|---|---|---|
| 4,059,215 | A | * | 11/1977 | Owen et al. ................. | 228/173.6 |
| 4,500,026 | A | * | 2/1985 | Larsen ....................... | 219/137 R |
| 6,460,614 | B1 | * | 10/2002 | Hamert et al. ................ | 165/170 |
| 7,121,002 | B1 | * | 10/2006 | Roth ........................ | 29/890.039 |
| 2008/0060796 | A1 | | 3/2008 | Cai | |

* cited by examiner

*Primary Examiner* — Christopher Besler
(74) *Attorney, Agent, or Firm* — Bacon & Thomas, PLLC

(57) ABSTRACT

A manufacturing method and structure of a heat exchanger for a bathing shower involves two plates welded together to form a passage for cold water. Hot water from the shower drips onto the upper plate and transfer heat to cold water flowing through the passage between the plates. The upper plate may be spot welded to the lower plate at bottoms of frustoconical indentations in the lower plate, the plates may sandwich an adiabatic layer, and/or the passage between the plates may be formed by pipes situated between the plates.

3 Claims, 19 Drawing Sheets

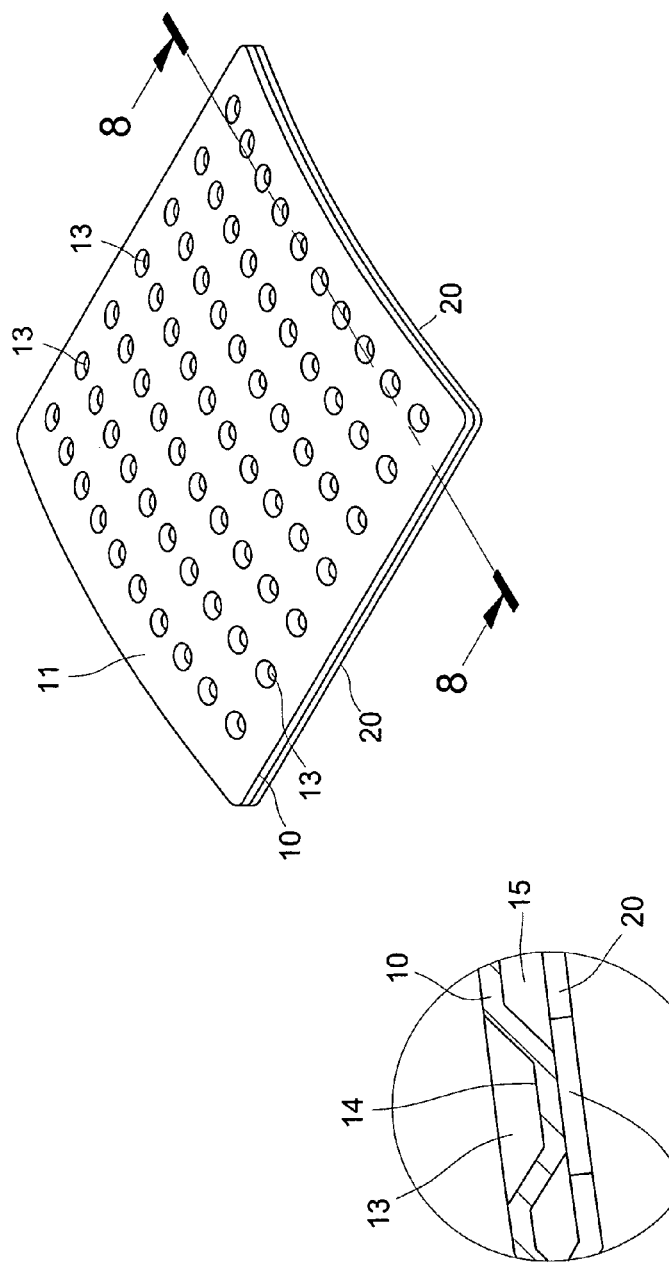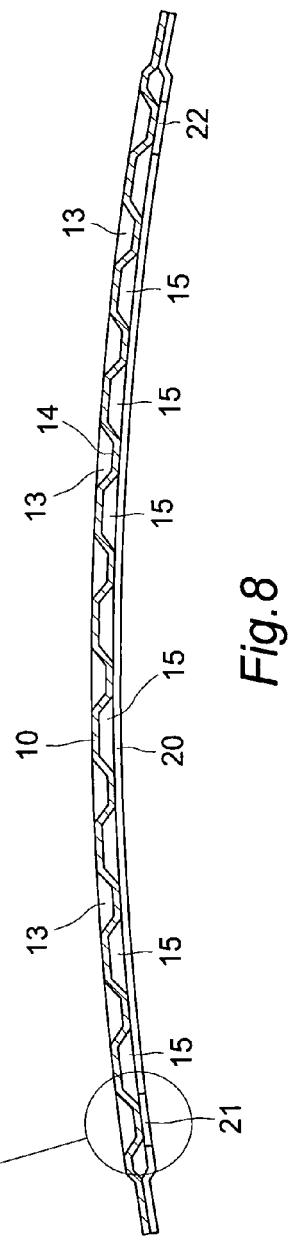

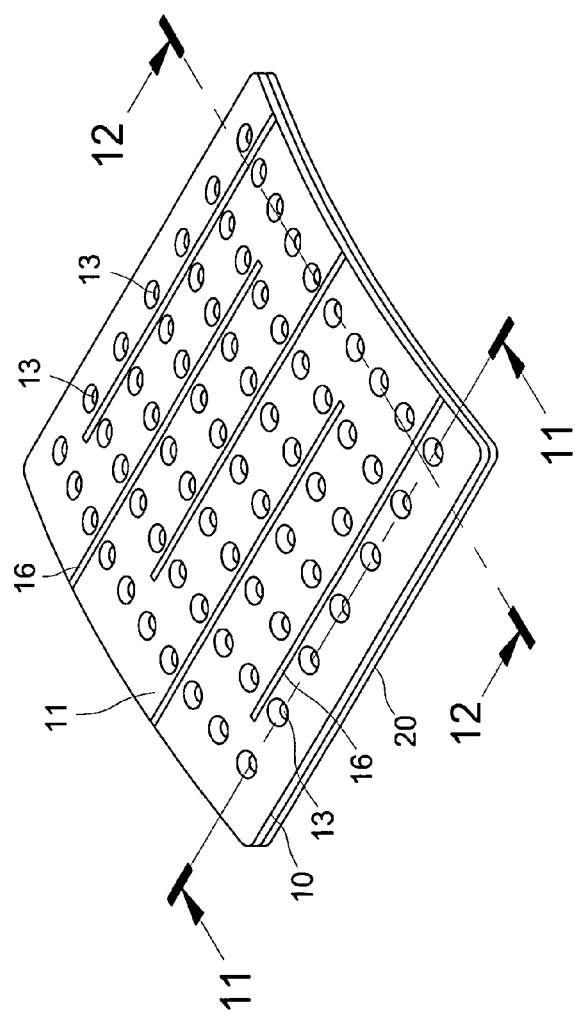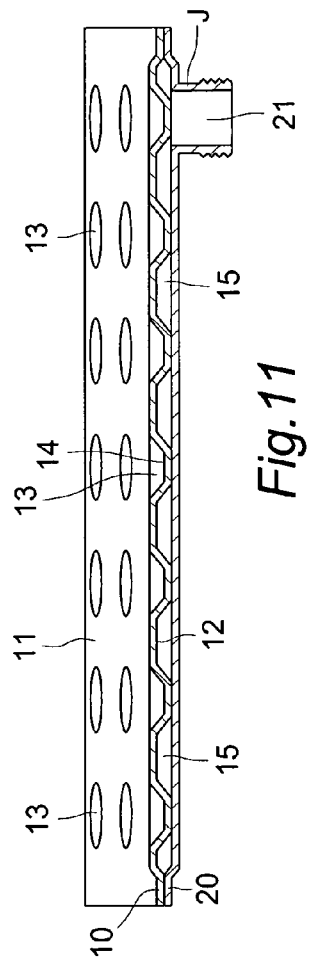

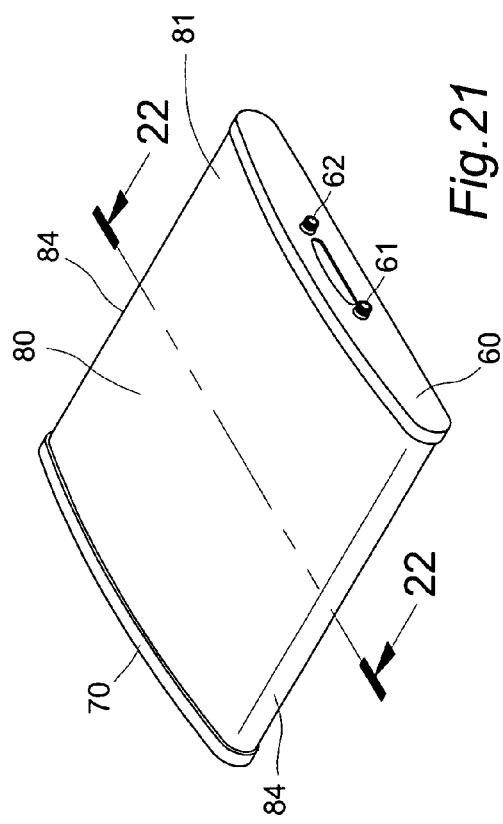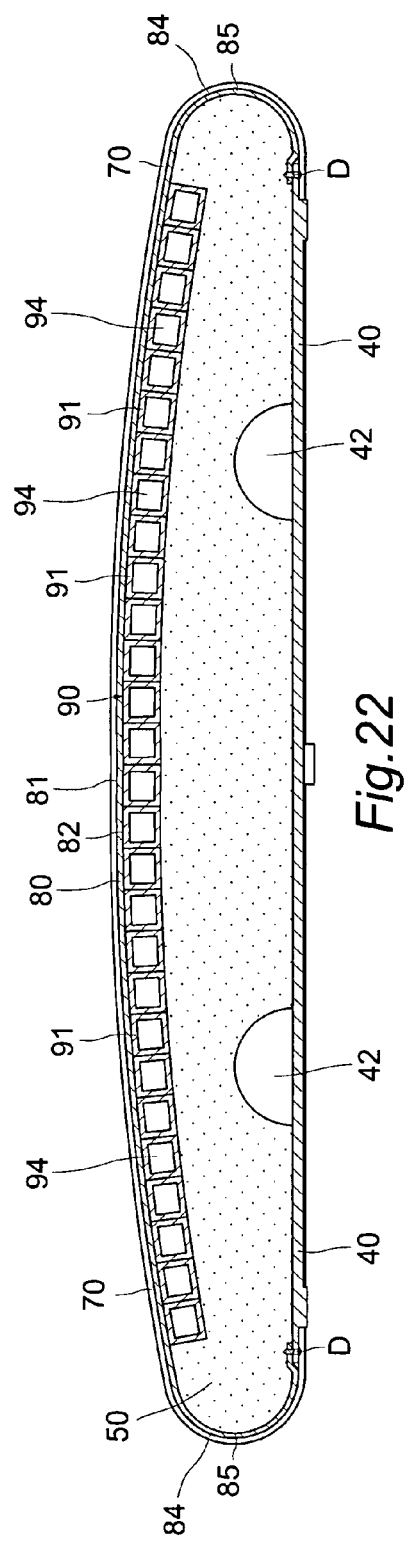

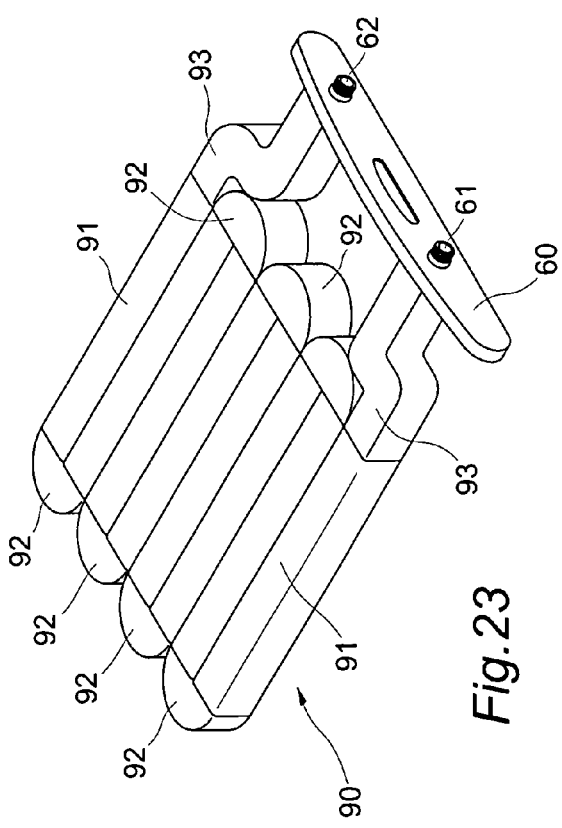
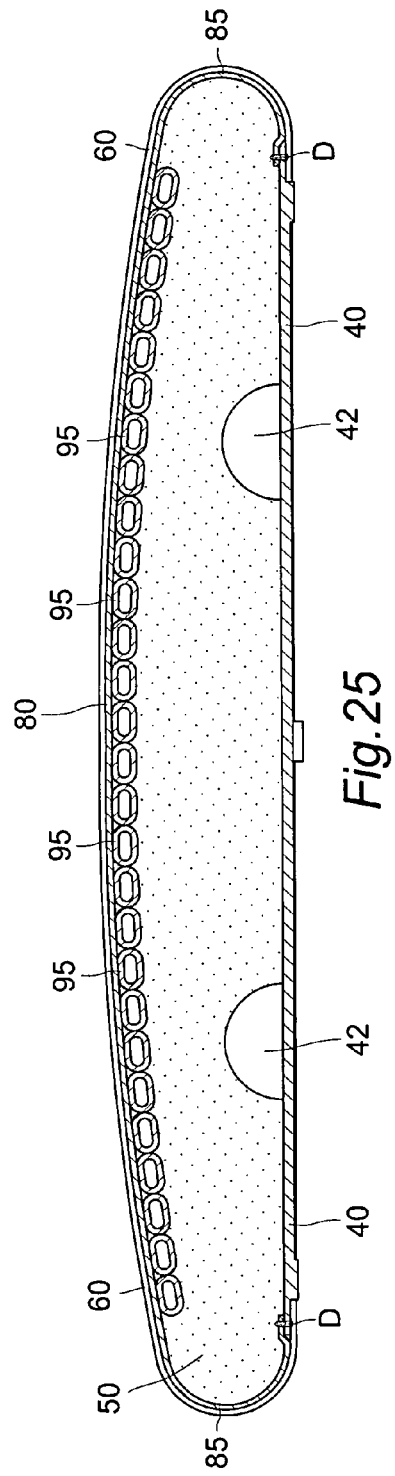

HEAT EXCHANGER FOR A BATHING SHOWER

FIELD OF THE PRESENT INVENTION

The present invention relates to an energy saving heat exchanger for a bathing shower, the heat exchanger having a simple structure that significantly decreases manufacturing time and costs and provides enhanced energy saving efficiency so as to make the heat exchanger more affordable and attractive to consumers. Thus, the invention not only provides increased popularity but also offers environmental protection due to increased energy saving and reduced carbon emissions.

BACKGROUND OF THE INVENTION

For the purpose of reducing their carbon footprint, many heat exchangers for bathing showers used in households have been introduced in the market. The design concept is that incoming cold tap water running through the heat exchanger is heated up by hot waste water from the shower, which serves as a thermal source, so that the temperature of the tap water output from the heat exchanger becomes warmer than that of the incoming tap water, the output being directed into an inlet pipe for the water heater of the bathing shower. As a result, the temperature of the inlet water for the water heater of the bathing shower is increased to save energy required for heating the water. However, due to the complicated structural design of these currently marketed heat exchangers, the manufacturing process and related machinery are relatively complex, so that not only are the selling price and manufacturing cost kept at a high level without possibility of lowering, but marketing promotion and popularity are retarded, discouraging purchasing and use by consumers and thereby limiting benefits to the environment. Therefore, simplification of the structural design and reduction in manufacturing costs of heat exchangers for bathing showers has become a critical need.

SUMMARY OF THE INVENTION

The primary object of the present invention is to provide a manufacturing method and structure of a heat exchanger for a bathing shower that is relatively simple to not only substantially decrease overall manufacturing costs, resulting in reduced selling price and increased affordability for consumers, but also in enhanced overall energy saving effect and prolonged service life span to encourage purchasing by consumers. Thus, the present invention not only facilitates promotion and increases popularity of bathing shower heat exchangers, but also achieves environmental protection by energy saving and reduced carbon footprint.

BRIEF DESCRIPTION OF THE DRAWINGS

FIG. 7 is a perspective view showing an intermediate product of the manufacturing process for the first embodiment of the present invention.

FIG. 8 is a sectional view taken along line 8-8 as indicated in FIG. 7.

FIG. 10 is a perspective view showing a heat exchanger for a bathing shower made by a modified manufacturing process for the first embodiment of the present invention.

FIG. 11 is a sectional view taken along line 11-11 as indicated in FIG. 10.

FIG. 21 is a perspective assembled view showing a heat exchanger for a bathing shower according to the third embodiment of the present invention.

FIG. 22 is a sectional view taken along line 22-22 as indicated in FIG. 21.

FIG. 23 is a perspective view showing a metal tubular array of a heat exchanger for a bathing shower according to the third embodiment of the present invention.

FIG. 25 is a cross sectional view showing a metal tubular array of a heat exchanger for a bathing shower according to the third embodiment of the present invention.

DETAILED DESCRIPTION OF THE PREFERRED EMBODIMENTS

Figure 3:
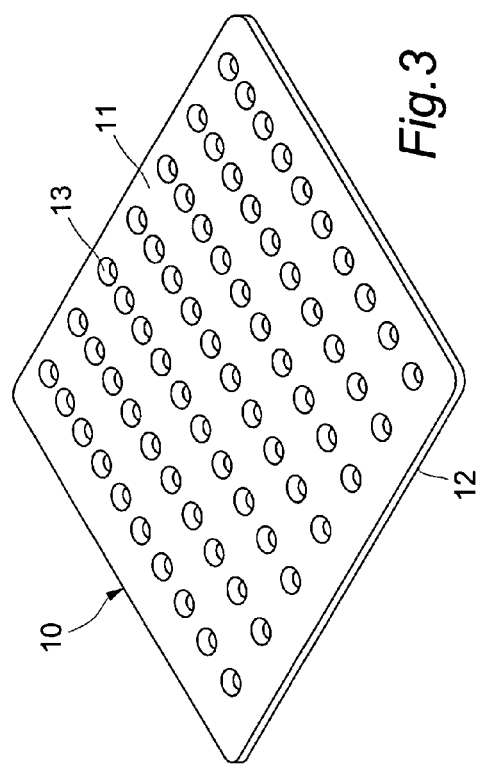
FIG. 3 is a perspective view showing the upper metal plate for the first embodiment of the present invention.
Figure 4:
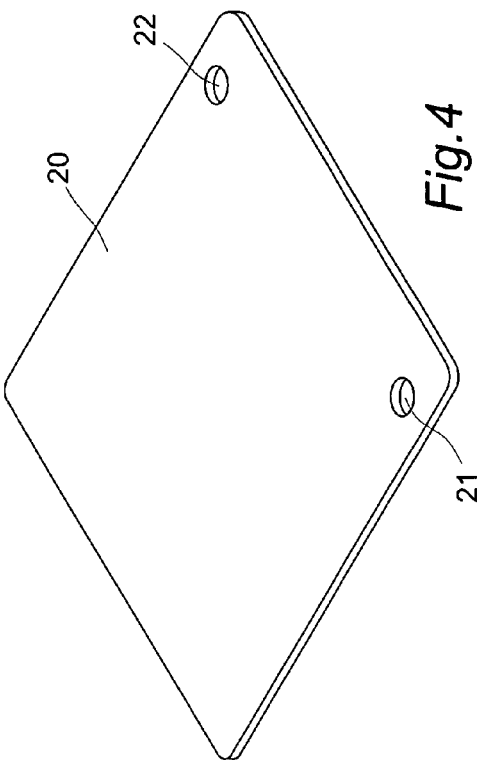
FIG. 4 is a perspective view showing the lower metal plate for the first embodiment of the present invention.
Figure 2:
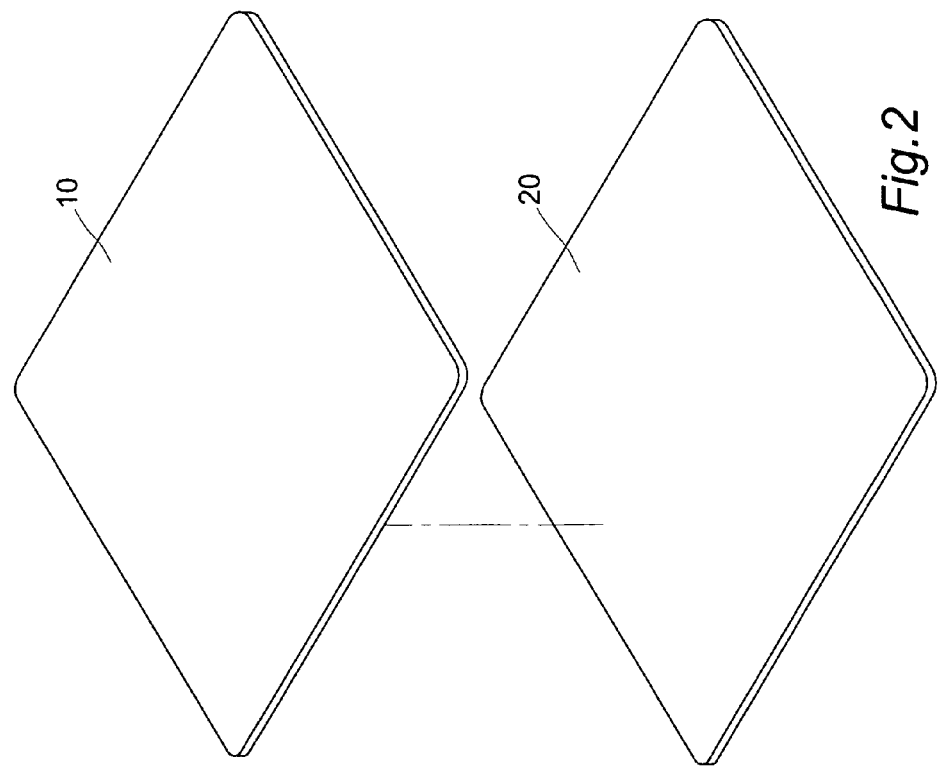
FIG. 2 is a perspective view showing an upper metal plate and a lower metal plate for the first embodiment of the present invention.
Figure 6:
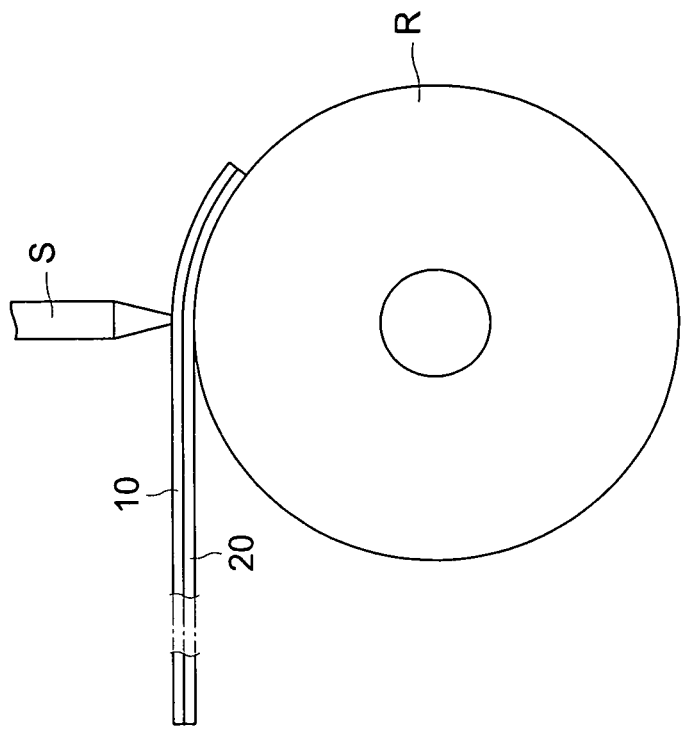
FIG. 6 is a second operational view showing spot welding of an upper metal plate and a lower metal plate for the first embodiment of the present invention.
Figure 5:
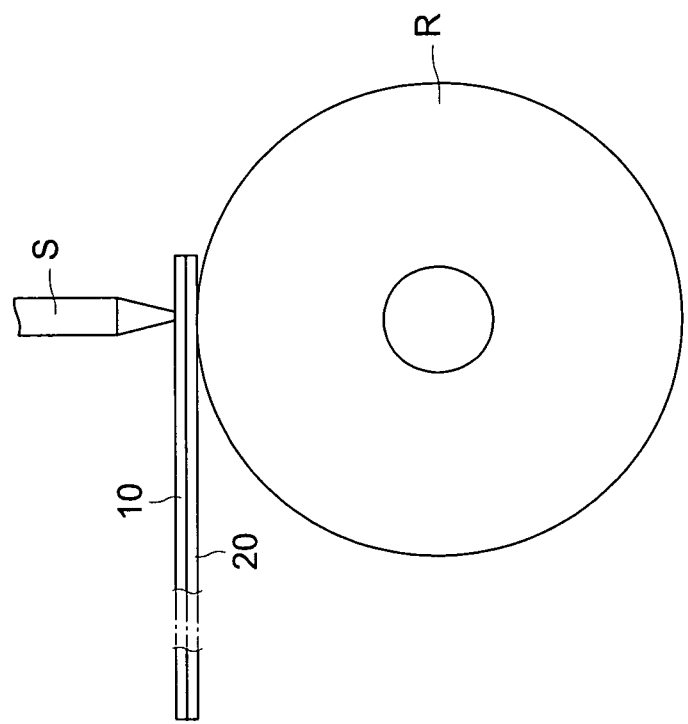
FIG. 5 is a first operational view showing spot welding of an upper metal plate and a lower metal plate for the first embodiment of the present invention.
Figure 9:
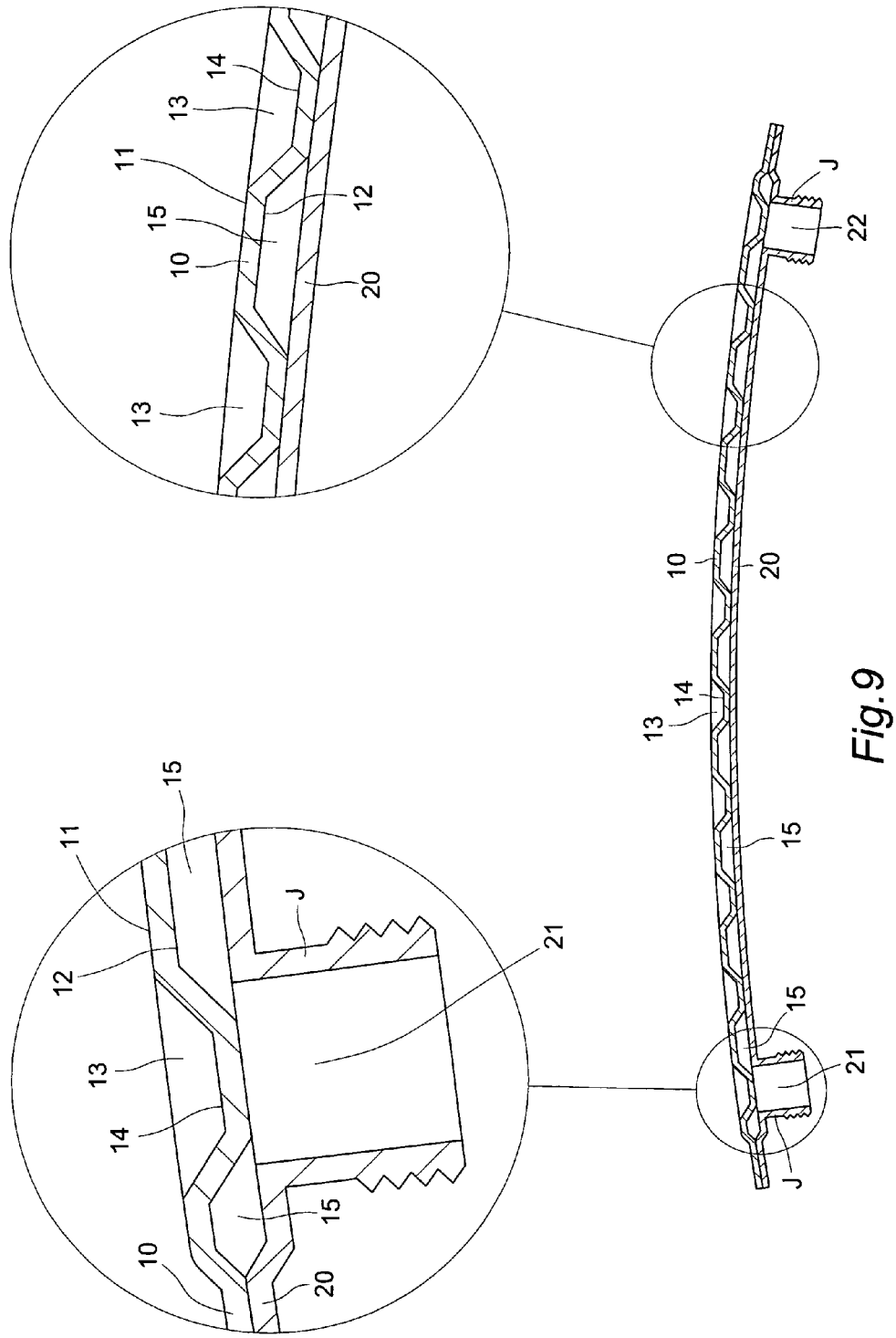
FIG. 9 is a cross sectional view showing application of a further processing step to the intermediate product of FIG. 7 and FIG. 8 in order to obtain a heat exchanger for a bathing shower according to the first embodiment of the present invention.

FIG. 1 and FIG. 2 to FIG. 9 show processing steps of a manufacturing method for embodiments of a "heat exchanger for bathing shower", as follows:

a. taking non-magnetic corrosion-resistant metal as a material, making an upper metal plate 10 and a lower metal plate 20 of same area by a stamp-shaping process (as shown in FIG. 2);

b. stamping a plurality of frustoconical indentations 13 in parallel, evenly-shaped rows, the indentations extending from a top surface 11 towards a bottom surface 12 of the upper metal plate 10 (as shown in FIG. 3), and stamping a water intake 21 and a water outtake 22 in the lower metal plate 20 (as shown in FIG. 4);

c. after stacking the bottom surface 12 of the upper metal plate 10 on the lower metal plate 20 in a flush manner, placing the upper and lower metal plates 10 and 20 on a spot welder S for spot welding (as shown in FIG. 5) so that each indentation bottom 14 of every frustoconical indentation 13 in a row is fusion welded in a predetermined order with corresponding spots on the lower metal plate 20 (as shown in FIG. 8) while a cathode roller R of the spot welder S bends the integral entity of the welded upper metal plate 10 and lower metal plate 20 into a camber plate (as shown in FIG. 6);

d. sealing all peripherals around the integral entity formed by the welded upper metal plate 10 and lower metal plate 20 (as shown in FIG. 7); and e. respectively welding a pipe fitting J to each water intake 21 and water outtake 22 individually on the lower metal plate 20 for finishing the manufacturing process (as shown in FIG. 9).

As shown in FIG. 8 and FIG. 9, the structure of a "heat exchanger for bathing shower" in the present invention manufactured by the process described above includes an upper metal plate 10 and a lower metal plate 20, wherein:

The upper metal plate 10, which is a rectangular cambered plate made of non-magnetic corrosion-resistant metal by a stamp-shaping process, has a plurality of frustoconical indentations 13 arranged in parallel evenly spaced rows stamped into top surface 11 and extending towards bottom surface 12 such that the diameter of each indentation bottom 14 is smaller than that of the opening of the respective frustoconical indentation 13 (as shown in FIG. 8 and related enlarged view); and The lower metal plate 20, which is a rectangular cambered plate made of non-magnetic corrosion-resistant metal by a stamp-shaping process with a same area as the upper metal plate 10 for being stacked beneath bottom surface 12 of the upper metal plate 10 by spot welding, has a water intake 21 and a water outtake 22 stamped therein such that a pipe fitting J may be respectively welded to each water intake 21 and water outtake 22 individually (as shown in FIG. 9) with the result that each indentation bottom 14 of every frustoconical indentation 13 in each row is fusion welded with corresponding spots on the lower metal plate 20, and all peripherals around the upper metal plate 10 and lower metal plate 20 are sealed by welding into an integral entity (as shown in FIG. 7) so that the interior space enclosed by the upper metal plate 10 and lower metal plate 20, other than that occupied by the plurality of frustoconical indentations 13, creates a hollow space 15 for water circulation (as shown in FIG. 9 and related enlarged view).

Figure 1:
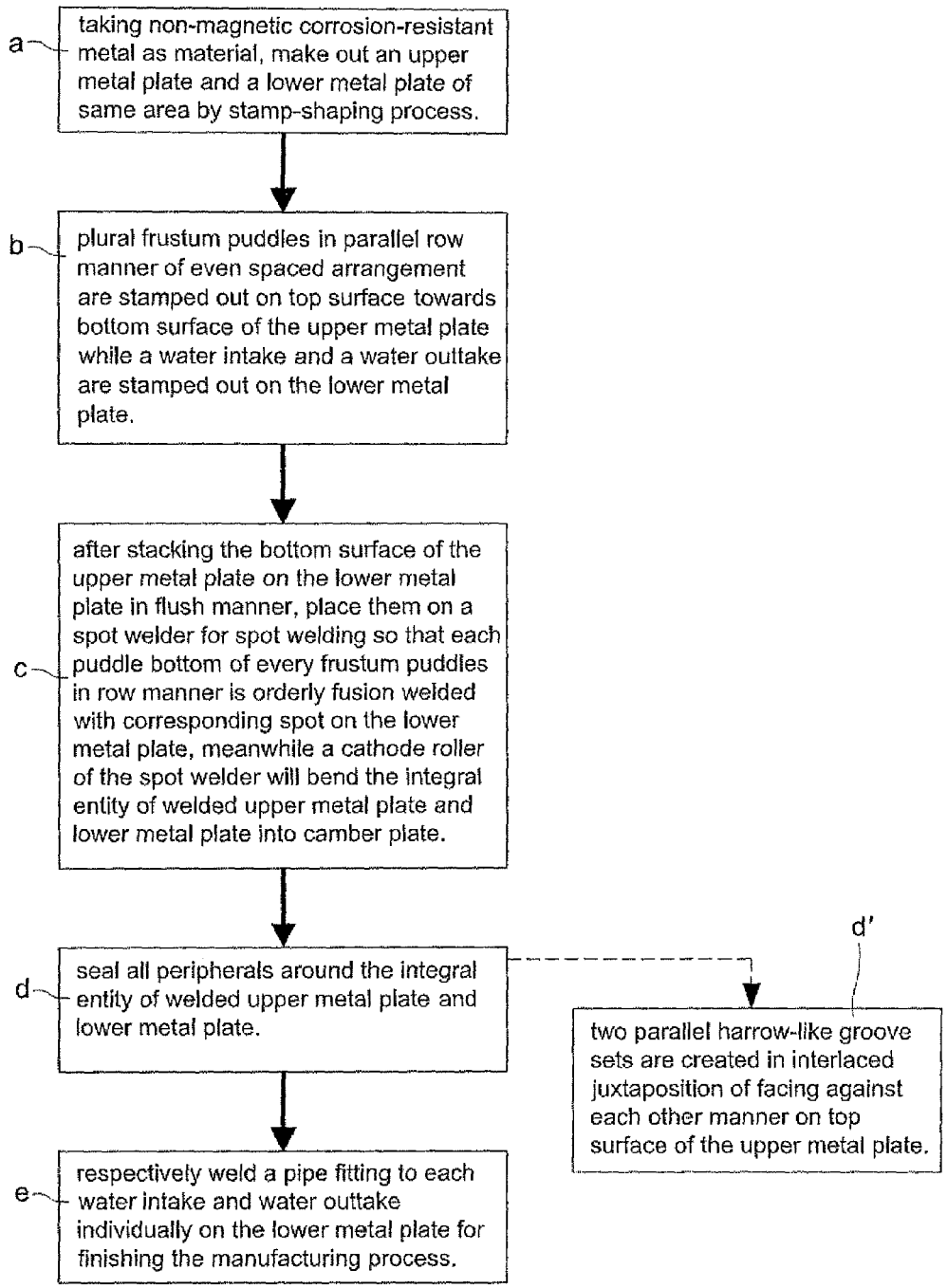
FIG. 1 is a flow chart showing a manufacturing process for the first embodiment of the present invention.
Figure 12:
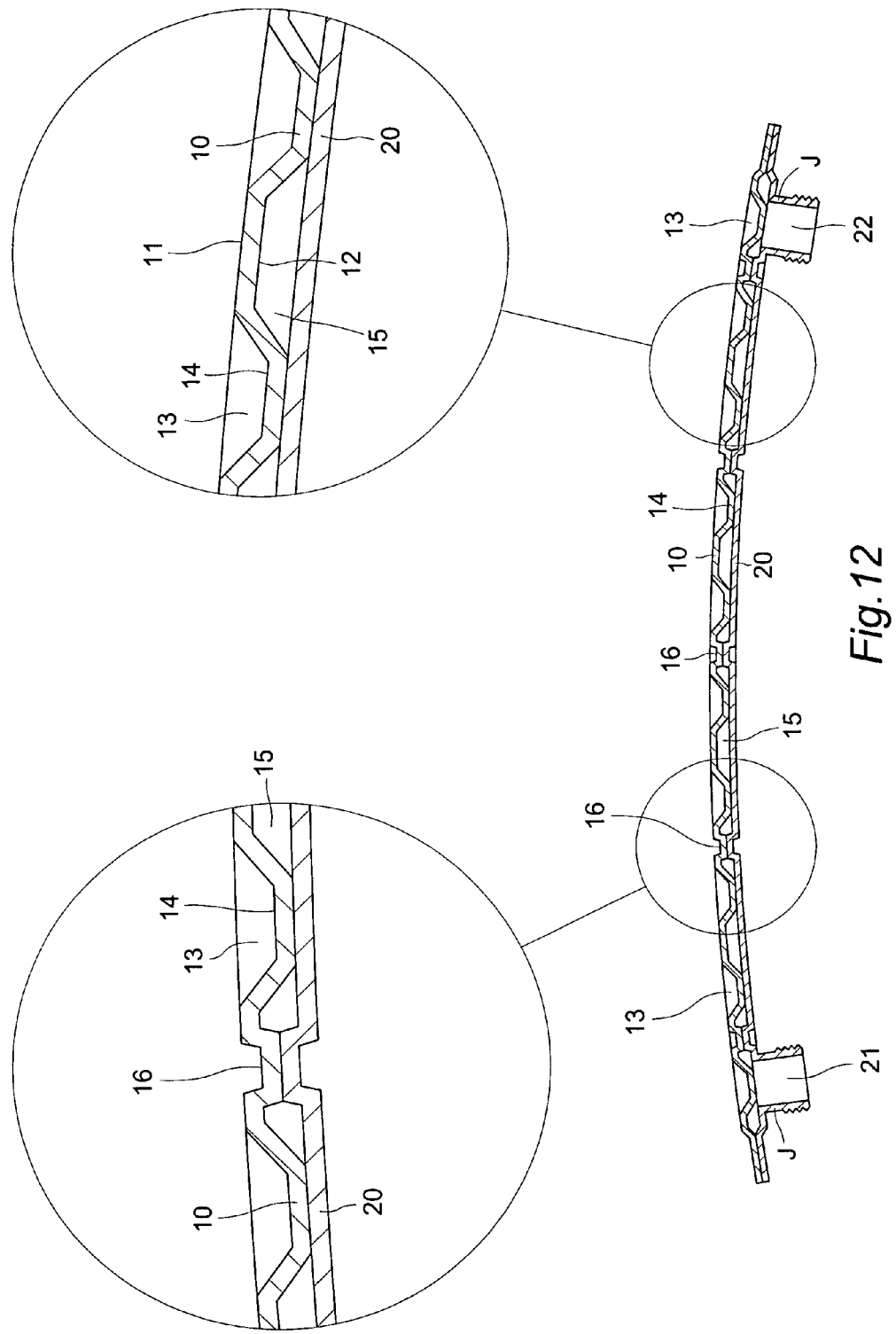
FIG. 12 is a sectional view taken along line 12-12 as indicated in FIG. 10.

As shown in FIG. 1, FIG. 10 and FIG. 12, the process step d can further include an additional step d', in which two interlaced comb-like parallel groove sets 16 are created on the top surface 11 of the upper metal plate 10 such that every adjacent prong in each of the groove sets 16 is separated by an even number, such as four, of rows of frustoconical indentations 13 (as shown in FIGS. 10 and 12). As a result, all prong grooves in each of the groove sets 16 is interlaced in facing manner to enhance the directional uniformity of water circulation in the hollow space 15 surrounding the frustoconical indentations 13, thereby promoting the efficiency of the heat exchange.

Figure 13:
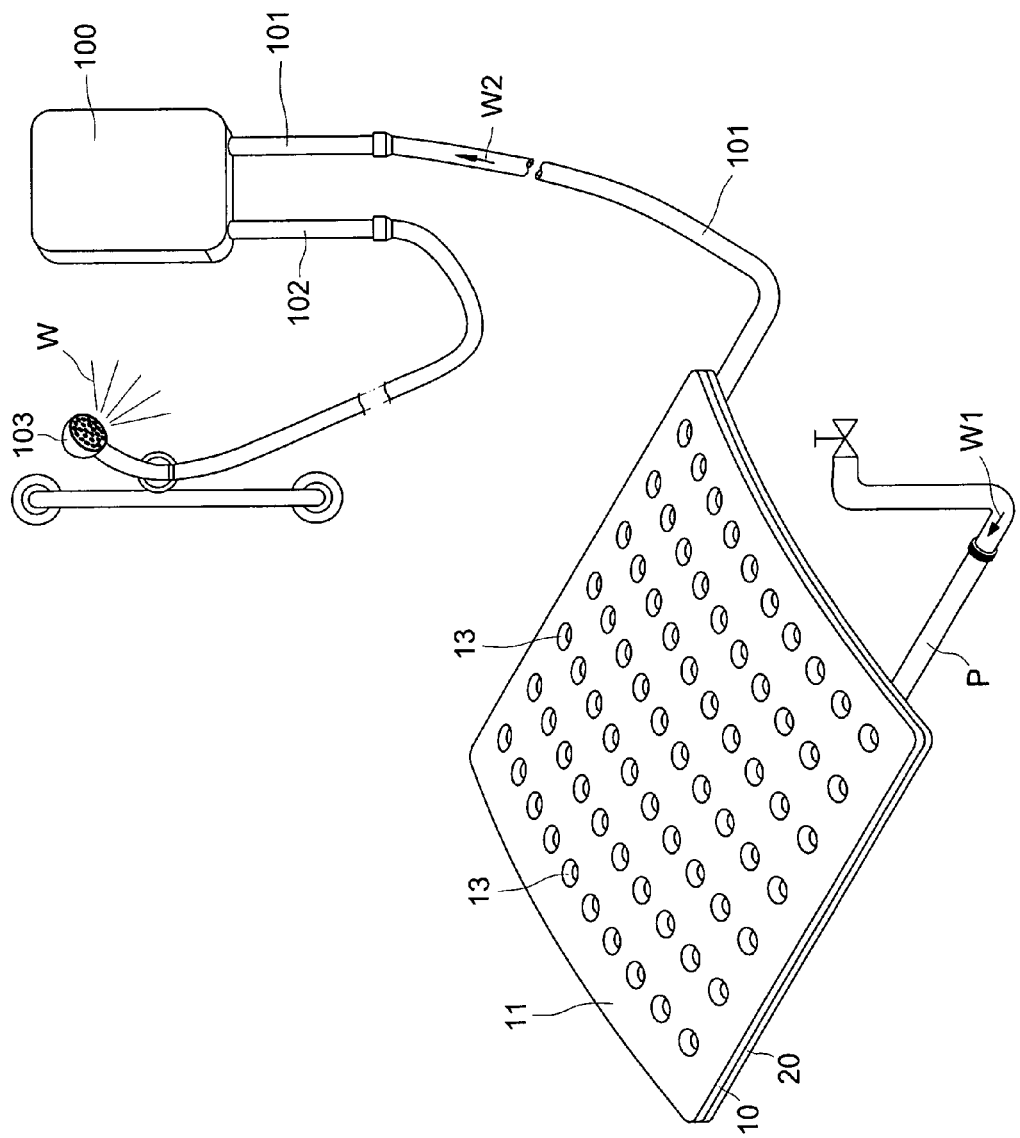
FIG. 13 is a perspective view showing an installation of a heat exchanger for a bathing shower made by the manufacturing process for the first embodiment of the present invention.
Figure 14:
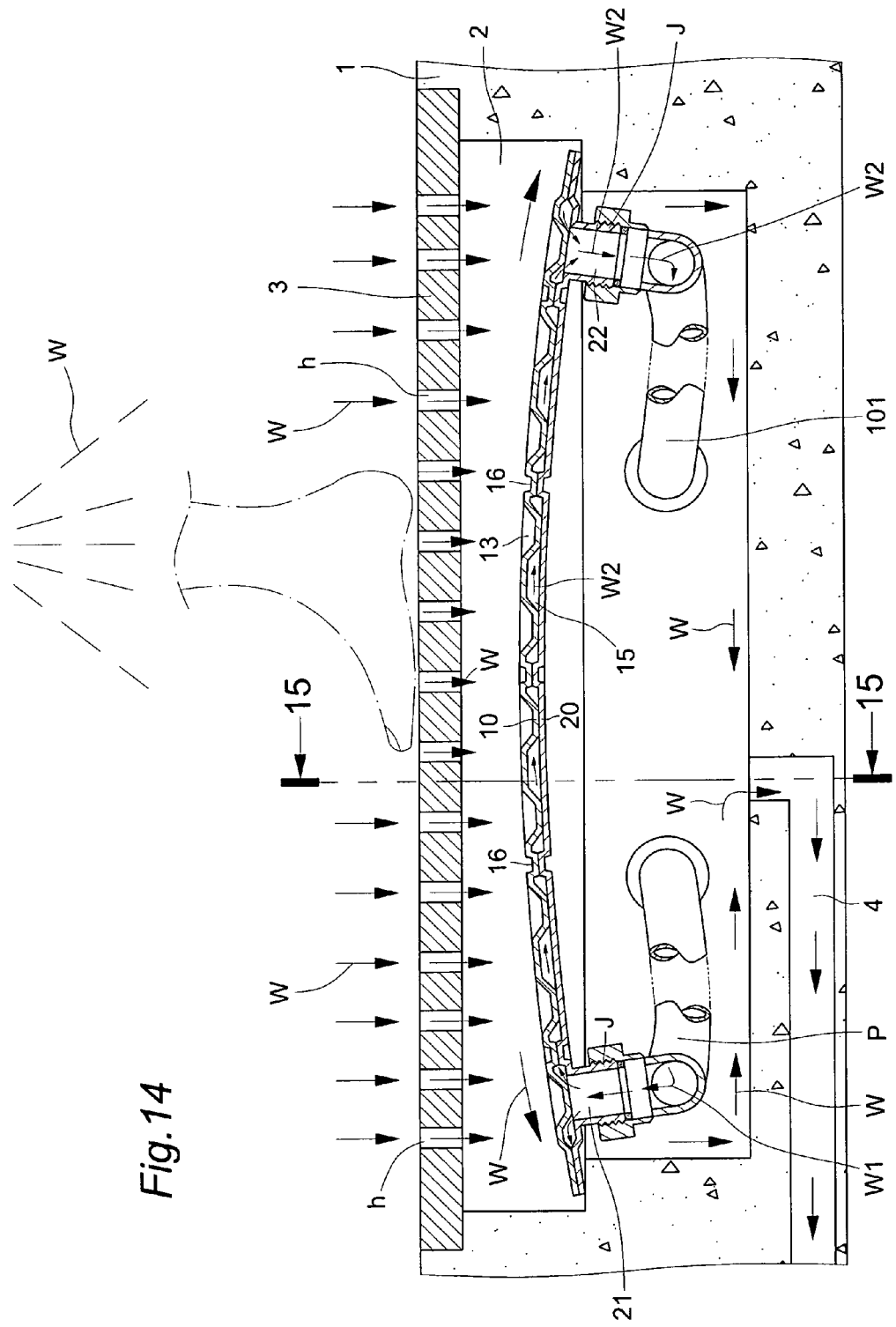
FIG. 14 is a cross sectional view showing an installation of a heat exchanger for a bathing shower made by the manufacturing process for the first embodiment of the present invention.
Figure 15:
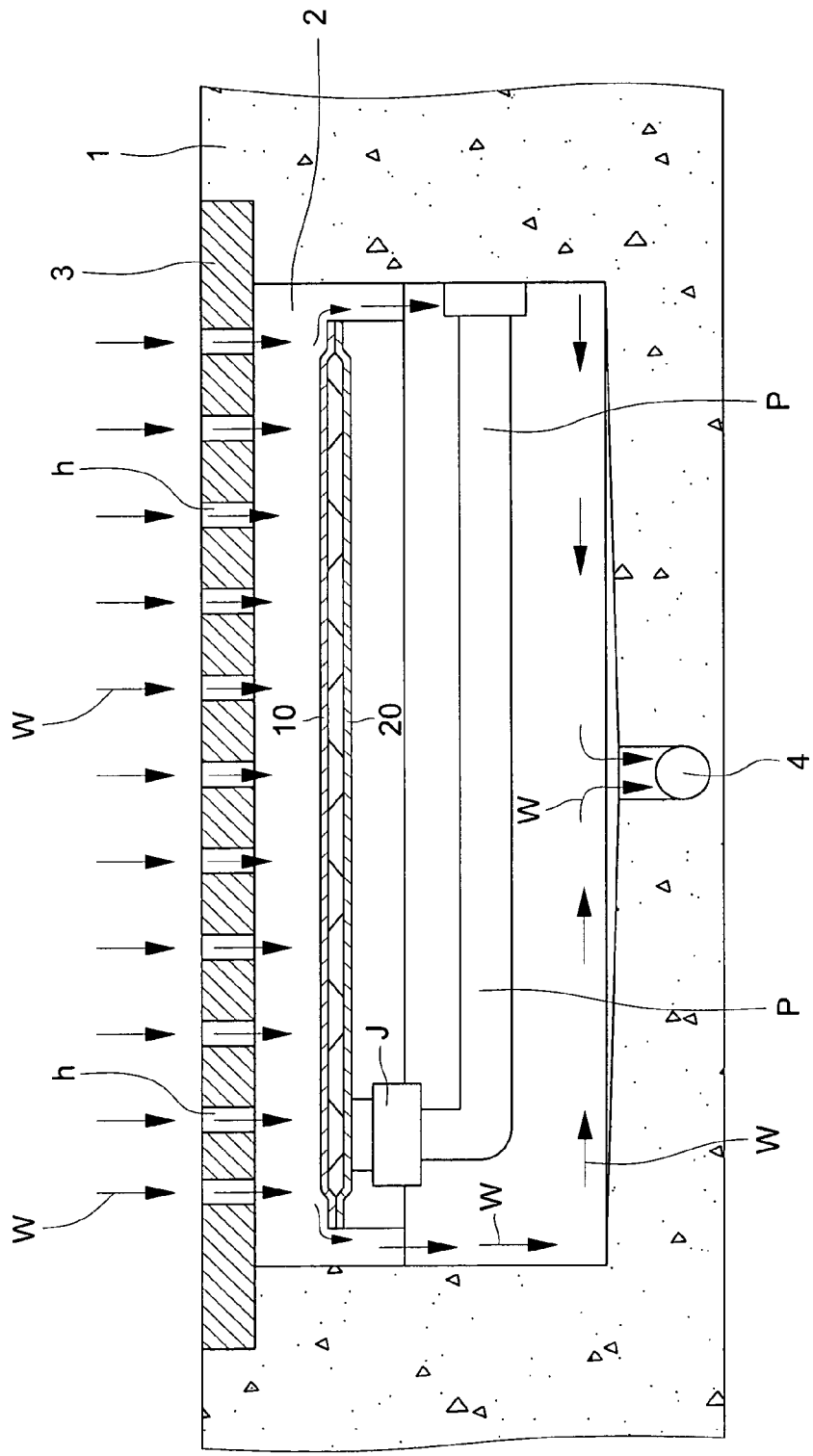
FIG. 15 is a sectional view taken along line 15-15 as indicated in FIG. 14.

FIG. 13 through FIG. 15 illustrate installation and operation of a heat exchanger for a bathing shower of the present invention. For installation, the heat exchanger is situated in a tiered basin 2 of the floor of bathroom 1. Then, a tap water pipe P is connected to the pipe fitting J of the water intake 21 in the lower metal plate 20. Third, an inlet pipe 101 of a water heater 100 is connected to the pipe fitting J of the water outtake 22 in the lower metal plate 20. Finally, a treading plate 3 with plural bores h is positioned over the top opening of the tiered basin 2 to cover the tiered basis 2 and finish the installation (as shown in FIG. 13 and FIG. 14). For shower operation, hot shower water W, which comes from the water heater 100 via outlet pipe 102 and exits a shower sprayer 103, is used for showering on the user's body. The hot shower water W then drips to the top surface 11 of the upper metal plate 10 via plural bores h in the treading plate 3 on the floor of bathroom 1. Third, cold tap water W1, which comes from the tap water pipe P via the pipe fitting J of the water intake 21 on the lower metal plate 20 and flows into the hollow space 15 enclosed by the bottom surface 12 of the upper metal plate 10 and the lower metal plate 20, will perform heat exchange by absorbing thermal energy of the hot shower water W that has already dripped to the top surface 11 of the upper metal plate 10. Fourth, the cold tap water W1 will become warm water W2 after the heat exchange. Fifth, the warm heat-exchanged water W2 will flow into the inlet pipe 101 of the water heater 100 via the pipe fitting J of the water outtake 22 on the lower metal plate 20 to save heating energy consumption of the water heater 100 (as shown in FIG. 13 and FIG. 14); and finally, the waste hot shower water W, which has been heat exchanged, will be discharged via a drain 4 at the bottom of the tiered basin 2 (as shown in FIG. 14 and FIG. 15).

It will be understood by those skilled in the art from the foregoing disclosure of the manufacturing process for the present invention that stainless steel plate #SUS303 or #SUS304 can be selected as a material of both the upper metal plate 10 and lower metal plate 20 for further stamping and spot welding into an integral entity using existing metalworking processes and machinery or equipment so that the selling price and manufacturing cost can be lowered to increase affordability, facilitate marketing promotion, and enhance popularity with consumers. Therefore, the invention will have a significant effect in advocating energy saving for a water heater 100 by recycling the hot shower water W. Moreover, the use of frustoconical indentations 13 to temporarily hold hot shower water W in the upper metal plate 10 will increase heat exchanging time with the cold tap water W1 to increase heat exchanging efficiency and promote the energy saving effect of the water heater 100.

Figure 16:
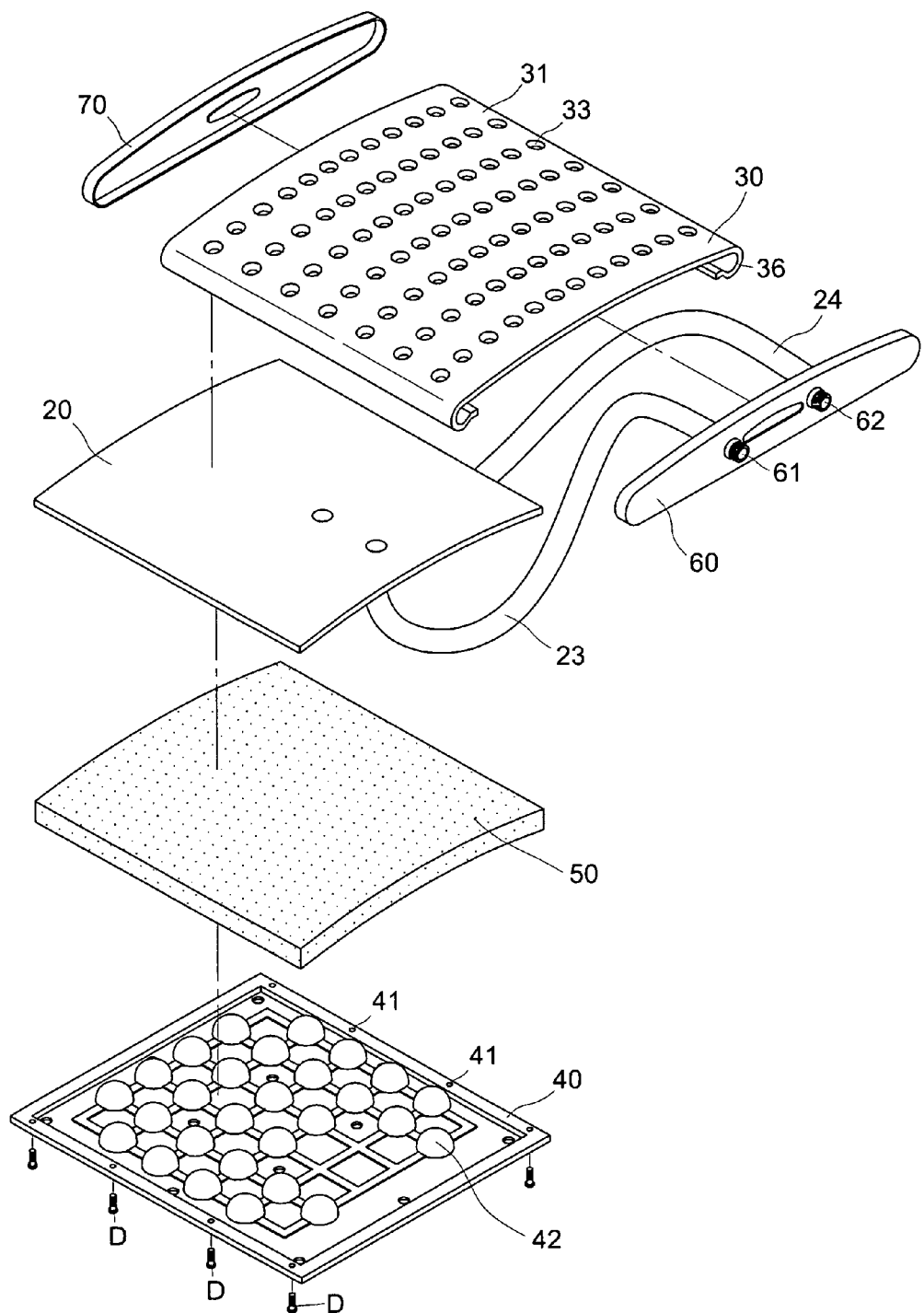
FIG. 16 is a perspective exploded view showing a heat exchanger for a bathing shower according to a second embodiment of the present invention.
Figure 18:
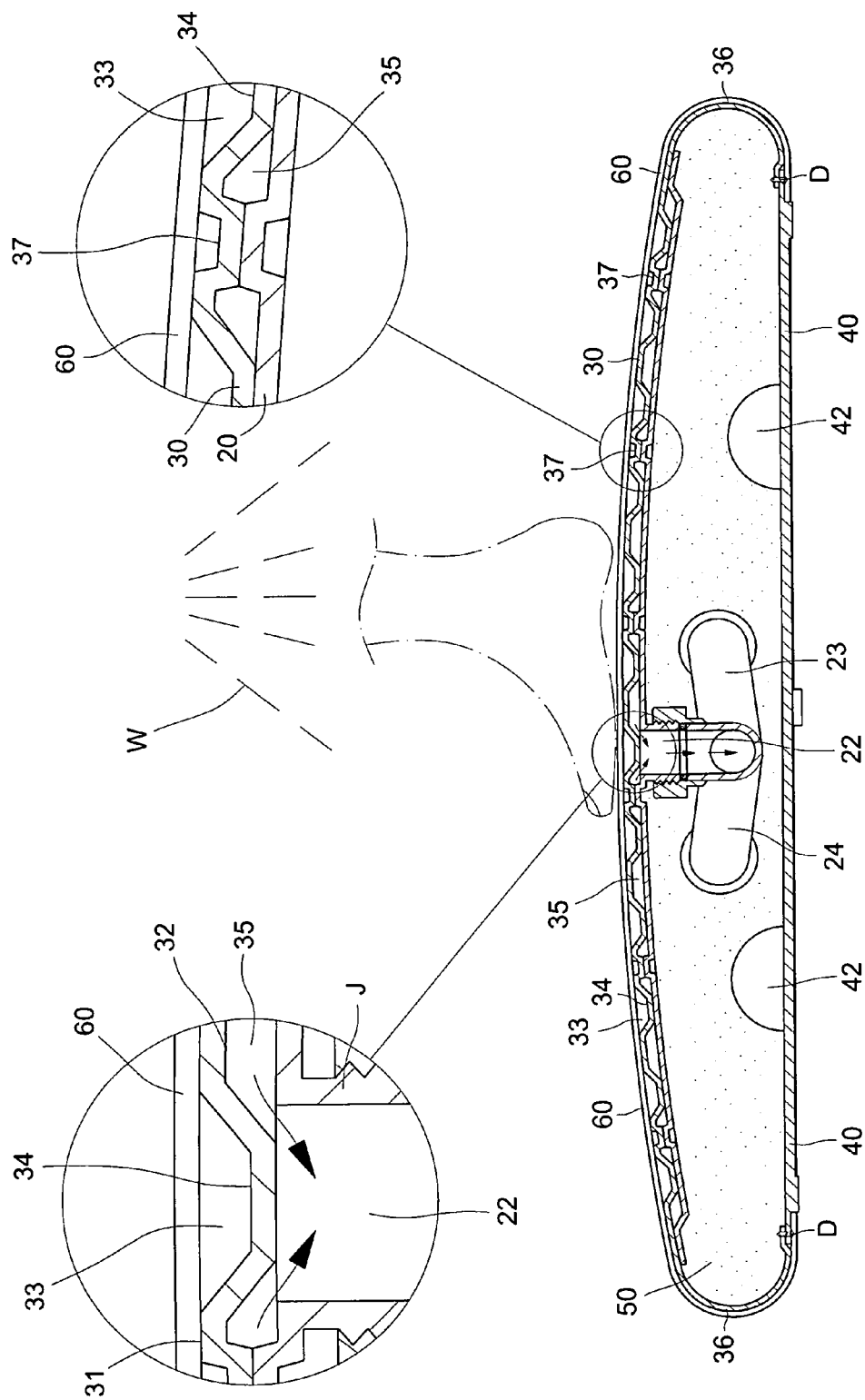
FIG. 18 is a sectional view taken along line 18-18 as indicated in FIG. 17.
Figure 19:
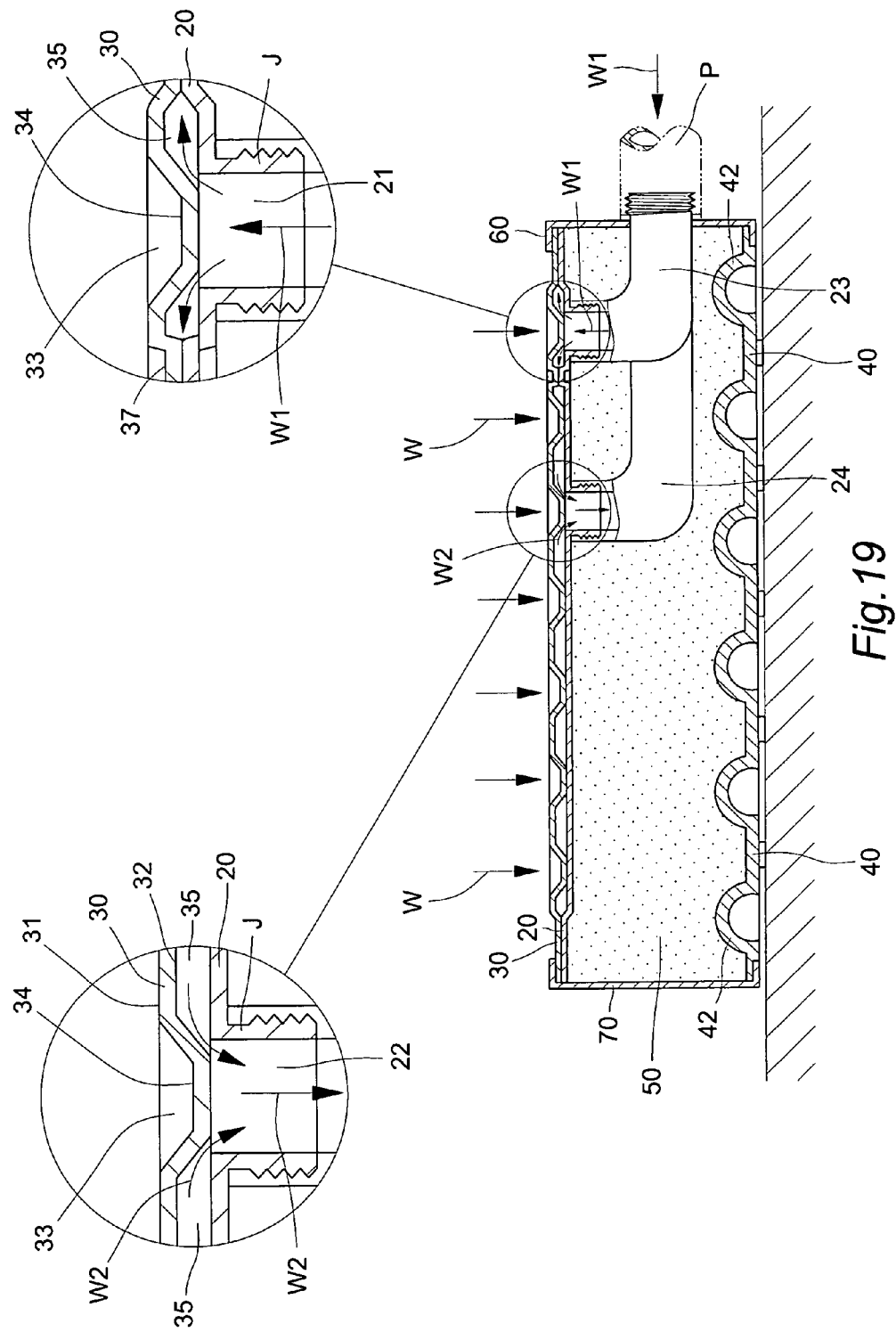
FIG. 19 is a sectional view taken along line 19-19 as indicated in FIG. 17.
Figure 20:
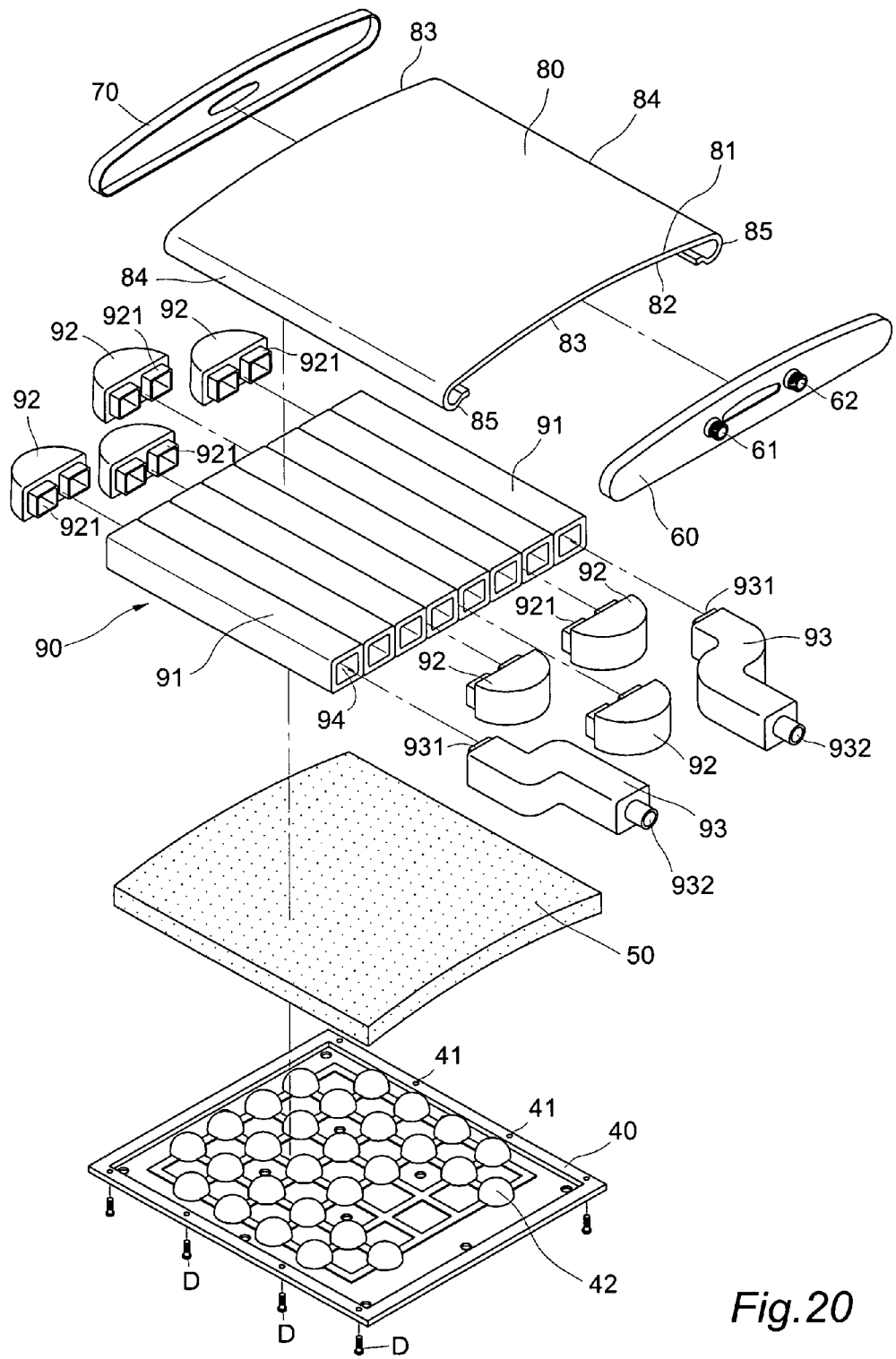
FIG. 20 is a perspective exploded view showing a heat exchanger for a bathing shower according to a third embodiment of the present invention.

FIGS. 16 through 19 show a heat exchanger for a bathing shower according to a second embodiment of the present invention. The heat exchanger for a bathing shower in this embodiment includes an upper metal plate 30, a lower metal plate 20, a sandwiched adiabatic layer 50, a deck 40, a right flank 60 and a left flank 70, wherein:

The upper metal plate 30, which is a rectangular cambered plate with a pair of longitudinal tucked edges 36 made of non-magnetic corrosion-resistant metal by a stamp-shaping process, has plural frustoconical indentations 33 arranged in evenly spaced parallel rows stamped into top surface 31 and towards bottom surface 32 such that the diameter of each indentation bottom 34 is smaller than that for the opening of the frustoconical indentation 33;

The lower metal plate 20, which is a rectangular cambered plate made of non-magnetic corrosion-resistant metal by a stamp-shaping process with an area smaller than that of the upper metal plate 30, is stacked beneath bottom surface 32 of the upper metal plate 30 and adhered by spot welding. The lower metal plate 20 has a water intake 21 and a water outtake 22 stamped therein such that an inlet duct 23 is welded to the water intake 21 and an outlet duct 24 is welded to the water outtake 22 respectively (as shown in FIG. 16); Thereby, each indentation bottom 34 of every frustoconical indentation 33 in each row is fusion welded with a corresponding spot on the lower metal plate 20, and all peripherals around the upper metal plate 30 and lower metal plate 20 are sealed by welding into an integral entity (as shown in FIG. 18) so that the entire interior space between the upper metal plate 30 and lower metal plate 20, other than the space occupied by frustoconical indentations 33, forms a hollow space 35 for water circulation (as shown in FIG. 18, FIG. 19 and related enlarged view);

The deck 40, which is a rectangle planar plate with a same area as the upper metal plate 30 and plural nipples 42 disposed on the top surface thereof for serving as a mounting foundation, has plural fixing holes 41 created in a pair of longitudinal margins thereof to enable automatic threading screws D to pass through to corresponding tucked edges 36 on the upper metal plate 30 for mounting deck 40 and plate 30 to each other;

The sandwiched adiabatic layer 50, which is made of materials with an adiabatic property such as foaming isocyanate, volatile polystyrene, wools of mineral dregs, aluminum silicate or the like, is sandwiched between the lower metal plate 20 and deck 40;

The right flank 60, which covers a right transverse side of the assembled upper metal plate 30 and deck 40, has an inlet pipe fitting 61 and an outlet pipe fitting 62 configured thereat such that the internal end of the inlet pipe fitting 61 is connected to the inlet duct 23 and the internal end of the outlet pipe fitting 62 is connected to the outlet duct 24; and The left flank 70, which covers other left transverse side of the assembled upper metal plate 30 and deck 40, has the same area and shape as those of the right flank 60.

Figure 17:
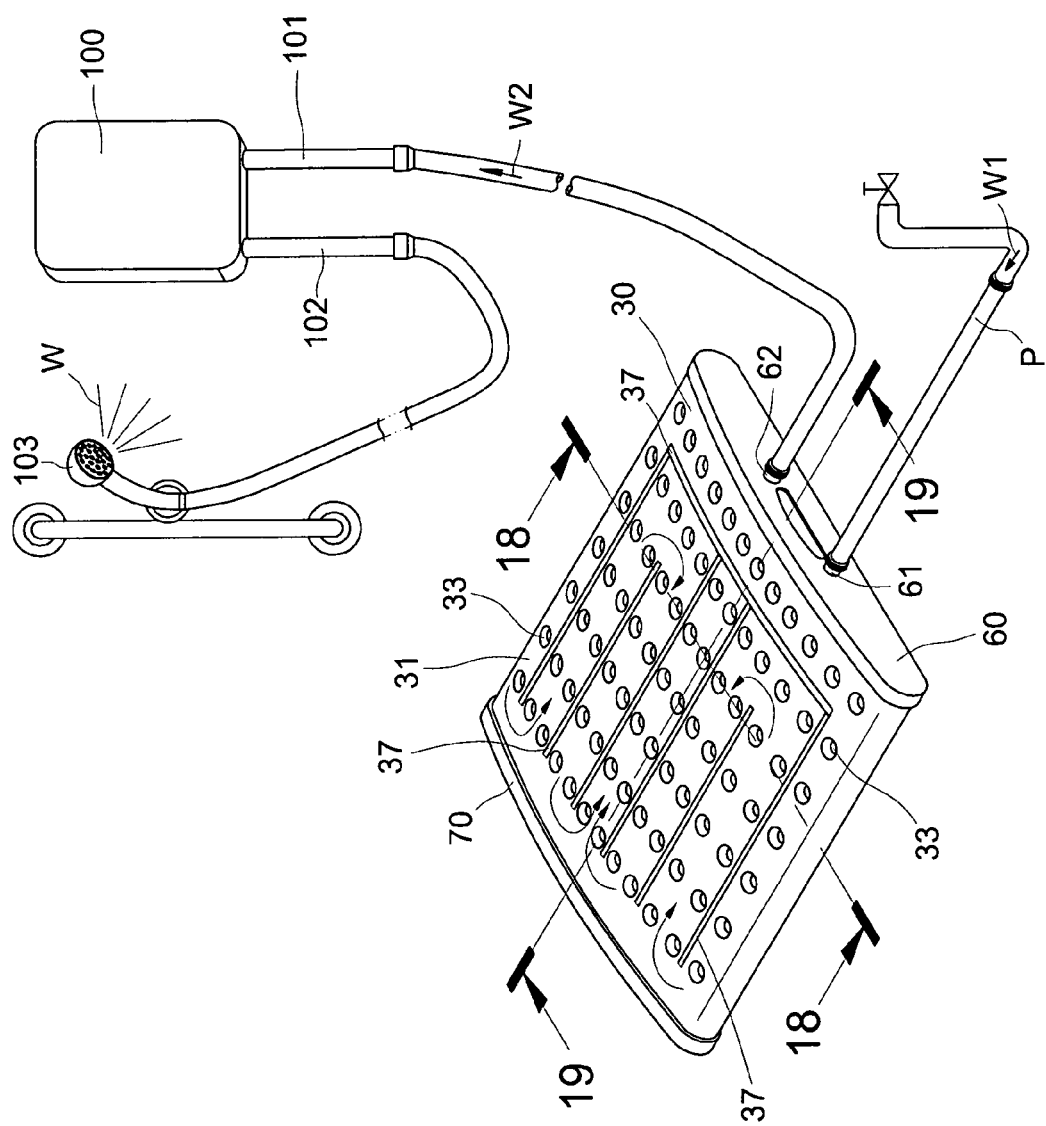
FIG. 17 is a perspective schematic view showing an installation of a heat exchanger for a bathing shower according to the second embodiment of the present invention.

Again, in this embodiment, two parallel comb-like groove sets 37 may be arranged in interlaced juxtaposition on the top surface 31 of the upper metal plate 30 such that every adjacent prong in each of the groove sets 37 is separated by an even number of rows, for example four rows, of the frustoconical indentations 33 (as shown in FIG. 17) so that all prong grooves in each of the groove sets 37 are interlaced in such a manner as to enhance the directionality of water circulation in the hollow space 35 with a resulting increase in the efficiency of the heat exchange.

FIG. 17 through FIG. 19 show the installation and operation of a heat exchanger for a bathing shower according to the second embodiment of the present invention. For installation, a tap water pipe P is connected to the inlet pipe fitting 61 of the right flank 60, and an inlet pipe 101 of a water heater 100 is connected to the outlet pipe fitting 62 of the right flank 60 to finish the installation. For shower operation, hot shower water W comes from the water heater 100 via outlet pipe 102 and exits the shower sprayer 103 for showering on the user's body, after which the hot shower water W drips to the top surface 31 of the upper metal plate 30. Then, cold tap water W1, which comes from the tap water pipe P via the inlet pipe fitting 61 of the right flank 60 and flows into the hollow space 35 enclosed by the bottom surface 32 of the upper metal plate 30 and the lower metal plate 20 via the inlet duct 23 and water intake 21 of the lower metal plate 20, performs heat exchange by absorbing thermal energy of the hot shower water W that has already dripped to the top surface 31 of the upper metal plate 30 (as shown in FIG. 19). The cold tap water W1 thus becomes warm heat-exchanged water W2 as a result of the heat exchange and flows into the inlet pipe 101 of the water heater 100 via the outlet pipe fitting 62 of the right flank 60 to save heating energy consumption by the water heater 100 (as shown in FIG. 17). Finally, the waste hot shower water W, which has been heat exchanged, is discharged out of an outlet duct 24 via a water outtake 22 in the lower metal plate 20 (as shown in FIG. 18).

Because of the adiabatic feature of the sandwiched adiabatic layer 50, the temperature of the warm heat-exchanged water W2 can be well maintained by the sandwiched adiabatic layer 50 so that minimal thermal energy of the warm heat-exchanged water W2 to the inlet pipe 101 of the water heater 100 will be lost. Moreover, the heat exchanging effect will be increased due to enhancement of the water circulating direction in the hollow space 35 by the two parallel comb-like groove sets 37 juxtaposition on the top surface 31 of the upper metal plate 30. Thus, the overall energy saving effect for the water heater 100 is substantially enhanced by the heat exchanger of the present invention. Furthermore, because of the supporting effect resulting from the indentation bottom 34 of each frustoconical indentation 33 in the upper metal plate 30 being closely attached to the lower metal plate 20, the heat exchanger assembly is strong enough to bear the body weight of the shower user without any deformation so that application safety is well provided.

Figure 24:
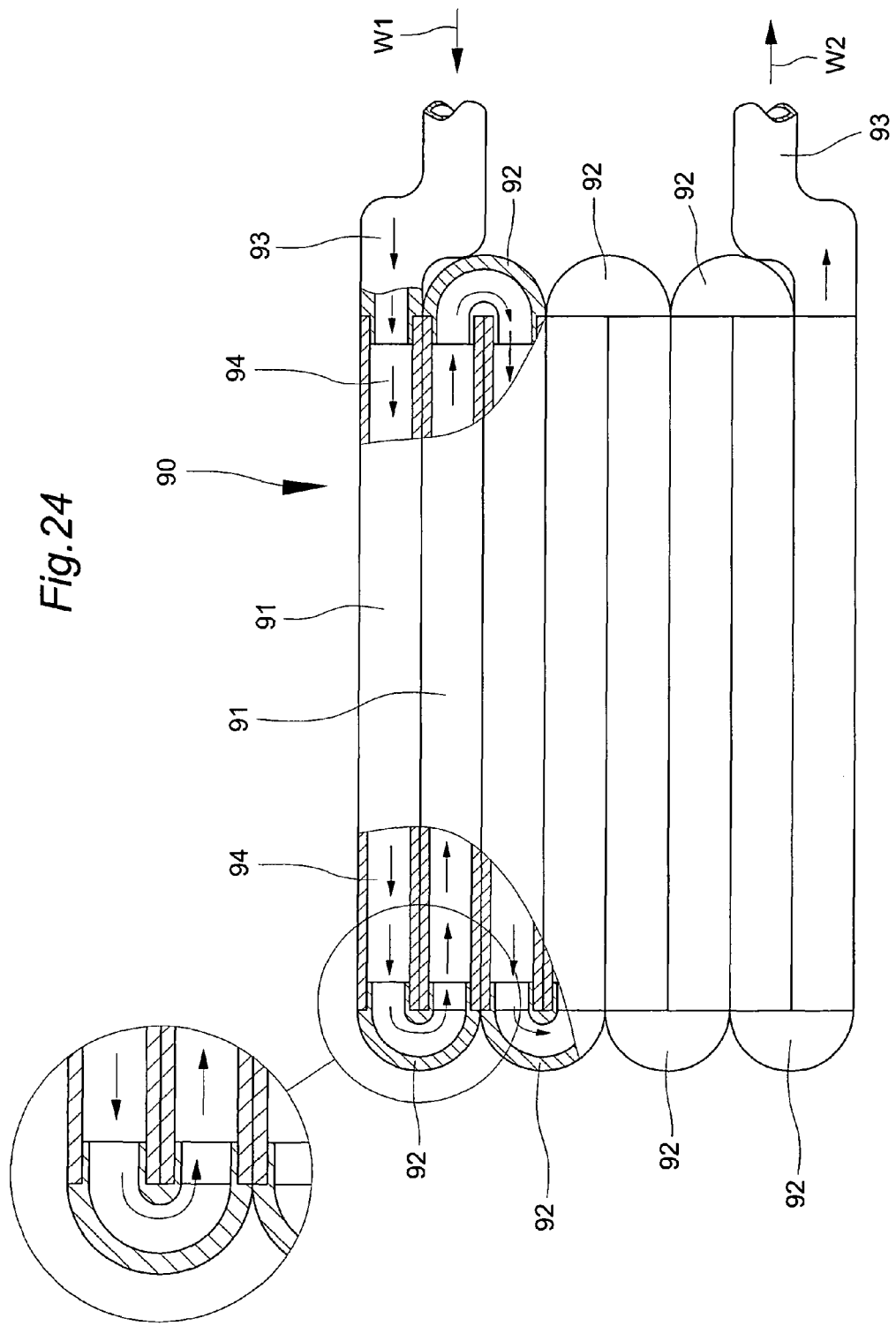
FIG. 24 is a top view showing a metal tubular array of a heat exchanger for a bathing shower according to the third embodiment of the present invention.

FIGS. 20 through 24 show a heat exchanger for a bathing shower according to a third embodiment of the present invention. The heat exchanger for a bathing shower in this embodiment includes a top metal plate 80, a metal tubular array 90, a sandwiched adiabatic layer 50, a deck 40, a right flank 60 and a left flank 70, wherein:

The top metal plate 80, which is a rectangular cambered plate made of a non-magnetic corrosion-resistant metal by a stamp-shaping process, has a top surface 81, a bottom surface 82, two transverse sides 83 and two longitudinal sides 84 with a pair of longitudinal tucked edges 85;

The metal tubular array 90, which is located beneath and attached to the bottom surface 82 of the top metal plate 80, includes a plurality of (8) straight metal tubes 91, a plurality of (left 4 and right 3) U-bend fittings 92, and two offset fittings 93, wherein the straight metal tubes 91, each of whose section shape is square, are abutted in order from frontmost to backmost, and referred to in the following description (but not in the drawings) as tubes 91-1, - - - , and 91-8;

Each U-bend fitting 92, which is a bent hollow tube with a pair of parallel square projections 921 configured at each open end respectively such that an outer size of each square projection 921 is slightly smaller than an inner size of each of the straight metal tubes 91, with the U-bend fittings 92 being referred to in the following description (but not the drawings) as 92-a, - - - , and 92-g in order from left-front corner to right-back corner via left-back corner and right-front corner;

Each of the offset fittings 93 has a square projection 931 disposed at an internal open end for connection to an open square end of the straight metal tubes 91 while a pipe fitting projection 932 is disposed at an external open end for connection to the inlet pipe fitting 61 or outlet pipe fitting 62 in the right flank 60;

By a suitable interlaced coupling arrangement of the plural straight metal tubes 91 and plural U-bend fittings 92 (for example, in which U-bend fitting 92-a couples each left end of straight metal tube 91-1 and straight metal tube 91-2 while U-bend fitting 92-e couples each right end of straight metal tube 91-2 and straight metal tube 91-3, and so on), a continuous water circulating passage 94 can be created in the metal tubular array 90 (as shown in FIG. 24);

The deck 40, which is a rectangular planar plate with a same area as the top metal plate 80 and plural nipples 42 disposed on the top surface thereof for serving as a mounting foundation, has plural fixing holes 41 created in a pair of longitudinal margins thereof to receive automatic threading screws D that extend through to corresponding pair tucked edges 85 on the top metal plate 80 for screw mounting the deck 40 to the top metal plate 80;

The sandwiched adiabatic layer 50, which is made of materials with an adiabatic property such as foaming isocyanate, volatile polystyrene, wools of mineral dregs or aluminum silicate and the like, is sandwiched between the metal tubular array 90 and deck 40;

The right flank 60, which covers a right transverse side of the assembled top metal plate 80 and deck 40, has an inlet pipe fitting 61 and an outlet pipe fitting 62 configured thereat such that the internal end of the inlet pipe fitting 61 is connected to a pipe fitting projection 932 of an offset fitting 93 and the internal end of the outlet pipe fitting 62 is connected to a pipe fitting projection 932 of the other offset fitting 93 (as shown in FIG. 23); and The left flank 70, which covers the other left transverse side of the assembled top metal plate 80 and deck 40, has the same area and shape as those of the right flank 60.

In this embodiment, all the square section shapes for the end section of each straight metal tube 91, the square fitting projection 921 of each U-bend fitting 92, and the square fitting projection 931 of each offset fitting 93 in the metal tubular array 90 can be altered into elliptic section shapes to adapt to elliptic straight metal tubes 95 (as shown in FIG. 25), elliptic fitting projections 961 and elliptic fitting projections 971 (not shown in FIG. 25).

In practical application, cold tap water W1 initially flows into the water circulating passage 94 in the metal tubular array 90 via, in order, the inlet pipe fitting 61 of the right flank 60 and connected offset fitting 93. Second, hot shower water W, after being sprayed onto the user's body, will drip to the top surface 81 of the top metal plate 80. Third, the cold tap water W1 will be heated up to become warm heat-exchanged water W2 after heat exchanging is carried out by the metal tubular array 90. Finally, the warm heat-exchanged water W2 is fed to the inlet pipe 101 of the water heater 100 via, in order, the other offset fitting 93 and connected outlet pipe fitting 62 (as shown in FIGS. 23 and 24) to achieve the effect of heating energy consumption saving for the water heater 100. Moreover, because of the big section area of the straight metal tube 91 in the metal tubular array 90, the heat exchanger for a bathing shower in this embodiment of the present invention can be applied in a large scale bathing shower site to supply a sufficient quantity of hot shower water W. Moreover, in addition to the relatively cheap procurement cost of the straight metal tubes 91, mass production of the U-bend fitting 92 and offset fitting 93 is feasible by means of a molding process. Therefore, the overall manufacturing cost can be substantially reduced without any negative effect on marketing promotion and selling of the heat exchanger for a bathing shower according to the present invention.

Figure 28:
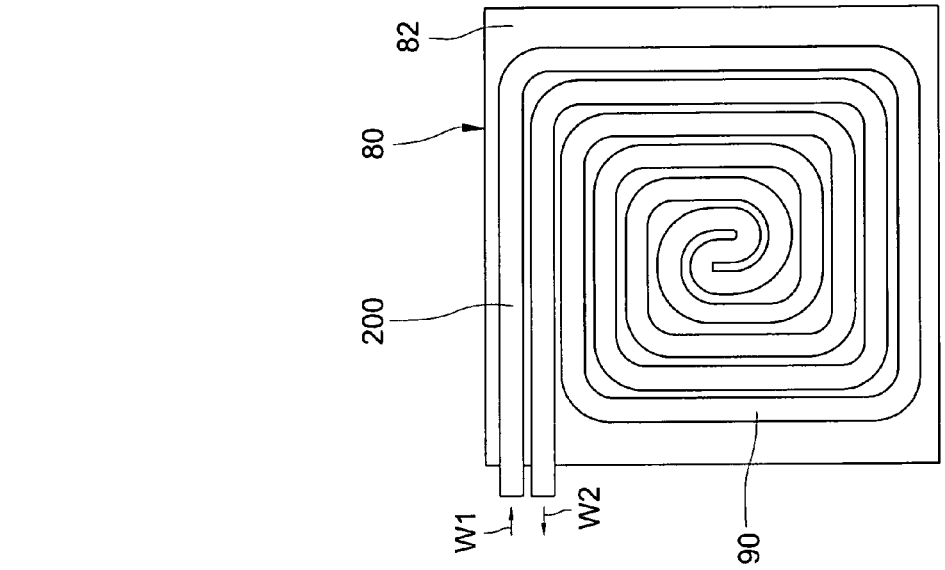
FIG. 28 is a third top view showing the other modified metal tubular array of a heat exchanger for a bathing shower according to the third embodiment of the present invention.
Figure 27:
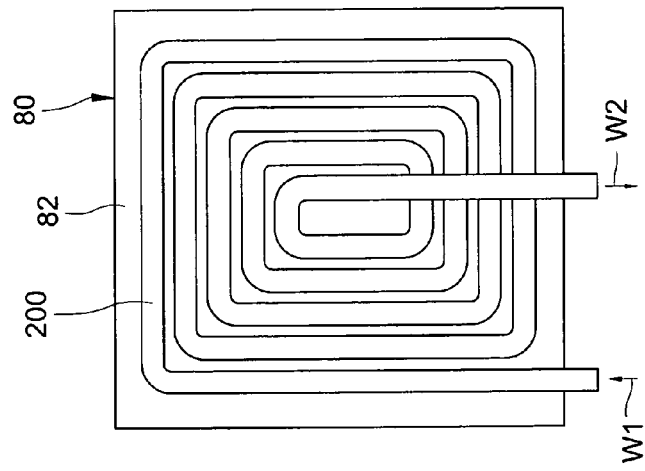
FIG. 27 is a second top view showing another modified metal tubular array of a heat exchanger for a bathing shower according to the third embodiment of the present invention.
Figure 26:
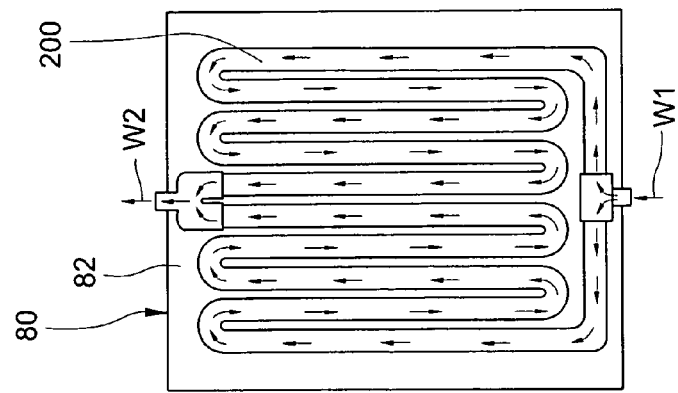
FIG. 26 is a first top view showing a modified metal tubular array of a heat exchanger for a bathing shower according to the third embodiment of the present invention.

Finally, referring to FIGS. 26 through 28, the above-described metal tubular array 90 can be modified into many variant metal tubular arrays 200, such as either an adapted serpentine configuration extending from both longitudinal margins and symmetrically arranged with respect to a central line beneath the bottom surface 82 of the top metal plate 80 and vice versa (as shown in FIG. 26), or an adapted coil configuration that is wound outwardly from center beneath the bottom surface 82 of the top metal plate 80 and vice versa (as shown in FIGS. 27 and 28). All of these different variations will have a significant effect in reducing energy consumption by the water heater 100.

What is claimed is:

1. A method of manufacturing a heat exchanger for a bathing shower, comprising the steps of:
   (a) preparing an upper metal plate and a lower metal plate by a stamp-shaping process, said upper and lower plates having equal areas;
   (b) stamping rows of indentations through a top surface of the upper metal plate towards a bottom surface of the upper metal plate and stamping a water intake and a water outtake in the lower metal plate;
   (c) after stacking the bottom surface of the upper metal plate flush against the lower metal plate, placing the upper metal plate and lower metal plate on a spot welder and spot welding bottoms of the indentations to the lower metal plate, and using a cathode roller of the spot welder to bend the spot welded upper metal plate and lower metal plate into a cambered plate assembly;
   (d) sealing edges of the welded upper metal plate and lower metal plate; and
   (e) respectively welding a pipe fitting to each water intake and water outtake on the lower metal plate.

2. A manufacturing method as claimed in claim 1, wherein step (d) further includes an additional step (d') of creating two parallel interlaced comb-like groove sets on a top surface of the upper metal plate.

3. A manufacturing method as claimed in claim 1, wherein said indentations are frustoconical and arranged in evenly-spaced parallel rows.

* * * * *